(12) United States Patent
Reeves et al.

(10) Patent No.: US 7,224,484 B1
(45) Date of Patent: May 29, 2007

(54) SCANNER CALIBRATION WITH DEAD PIXEL COMPENSATION

(76) Inventors: Gerald J. Reeves, 2990 Duane Dr., Meridian, ID (US) 83642; Douglas G. Keithley, 10740 W. Skycrest, Boise, ID (US) 83713

( * ) Notice: Subject to any disclaimer, the term of this patent is extended or adjusted under 35 U.S.C. 154(b) by 980 days.

(21) Appl. No.: 09/680,543

(22) Filed: Oct. 4, 2000

(51) Int. Cl.
    *H04N 1/00* (2006.01)
    *H04N 9/64* (2006.01)

(52) U.S. Cl. .................. 358/1.9; 358/406; 358/446; 348/246; 348/247

(58) Field of Classification Search ............... 358/406, 358/445, 446, 482, 483, 1–9, 504; 348/207.99, 348/241, 246, 616, 619, 607, 247; 345/8; 250/370.09; 382/274, 275
See application file for complete search history.

(56) References Cited

U.S. PATENT DOCUMENTS

| | | | | |
|---|---|---|---|---|
| 3,904,818 A * | 9/1975 | Kovac | ................. | 348/243 |
| 4,343,021 A * | 8/1982 | Frame | ................. | 348/247 |
| 4,389,677 A * | 6/1983 | Rushby et al. | ............ | 358/463 |
| 4,590,520 A * | 5/1986 | Frame et al. | ............ | 348/616 |
| 4,638,371 A * | 1/1987 | Milch | ................. | 358/474 |
| 5,436,659 A * | 7/1995 | Vincent | ............ | 348/246 |
| 5,886,353 A * | 3/1999 | Spivey et al. | ............ | 250/370.09 |
| 5,920,344 A * | 7/1999 | Kim | ................. | 348/246 |
| 6,055,066 A * | 4/2000 | Kanda | ............ | 358/461 |
| 6,456,261 B1 * | 9/2002 | Zhang | ............ | 345/8 |
| 6,819,359 B1 * | 11/2004 | Oda | ............ | 348/247 |

* cited by examiner

*Primary Examiner*—Douglas Q. Tran
*Assistant Examiner*—Chan S. Park

(57) ABSTRACT

When a sensor of a scanning array is identified as "bad" (defective), data from a neighboring "good" sensor is used to determine pixel data nominally associated with the bad sensor. During a calibration procedure, dark-offset and gain values are determined for each sensor to compensate for individual differences between the sensors of the array. These values are entered into a table in memory. During scanning of an actual image, the values are used to determine digital image pixel data from the signal data provided by the sensors. The calibration procedure also identifies bad sensors, e.g., sensors that remain on or off, irrespective of the illumination incident to them. Extreme offset and gain values are entered into the table locations associated with the respective sensor. When the extreme values are detected, the signal data for the respective sensor is discarded, and the pixel data associated with the most recently processed good sensor is used as the pixel data associated with the bad sensor. Thus, instead of being all white or all dark, pixels associated with a bad sensor match neighboring pixels. Generally, this result is far more acceptable perceptually. Thus, a scanner can have a useful life beyond the failure of one or more sensors of the scanning array.

12 Claims, 2 Drawing Sheets

SCANNER CALIBRATION WITH DEAD PIXEL COMPENSATION

BACKGROUND OF THE INVENTION

The present invention relates to digital imaging and, more specifically, to image-scanning systems.

Much of modern progress is associated with the increasing prevalence of computers. Computers typically manage information in the form binary values embodied as voltage values. Since this form of information is not directly accessible to humans, peripherals that translate between the human perceptual world and the digital world of computers have also become increasingly prevalent. For example, printers convert digital image data to human-readable images, and scanners convert human-readable images to digital data.

Many scanners convert an image to digital form raster (line-by-line) fashion. Each line is digitized using a linear array of photo-sensors that extends across some or all of the width of the image. For example, some scanners use a contact image sensor (CIS) array. The CIS array illuminates an image with light-emitting diodes (LEDs), uses a lens array to set a focal distance, and senses the light with CMOS photo-sensors. Each photo-sensor characterizes one pixel of an image line. The array is scanned so that each photo sensor traverses the length of the image. The output of each sensor is sampled so that the collective output of the array is a digital representation of the image. The digital representation can be a 1-bit monochrome representation, a multi-bit grey-scale representation, or a multi-bit color representation.

Unfortunately, the CIS is not a perfect sensor. Sensor gain (the amount a sensor's electrical output varies for a given change in its photo input) and offset (the output level when there is no illumination) vary from sensor to sensor, and may degrade over time. The LED light sources vary from unit to unit and will change intensity over long periods of time (years). The optics have imperfections and shadows. The glass surface can become scratched or contaminated. To compensate for imperfections in light sources, optics, sensors, and electronics, the CIS must be calibrated before a good scan/copy can be made, and may require user re-calibration.

In some cases, a sensor is so far out of specifications that calibration alone does not yield satisfactory performance. One sensor that is far out of specification can result in a calibration that causes the remaining sensors to operate out of an optimal range, resulting in poor overall image quality. In extreme cases, one or more "dead" sensors may fail to respond to variations in light intensity: a permanently "off" sensor may indicate "dark" in the presence of light; or, a permanently "on" sensor may indicate "light" even in the absence of light.

A dead or otherwise defective sensor can result in an artifact over the length of an image. For example, an always-off pixel can result in a dark vertical line in the digital image, while an always-on pixel can result in a light vertical line in the digital image. If this condition is detected at the manufacturer, the usual solution is to replace the sensor array. However, if the problem develops at the user's site, then an inconvenient and expensive repair can be required.

What is needed is an approach for handling defective sensors, especially when the defect is developed in use. Preferably, satisfactory scanning should be achievable even with the presence of one or more defective sensors.

SUMMARY OF THE INVENTION

The present invention provides an image-digitizing system, such as a scanner, which helps compensate for "bad" scan sensors by using information from neighboring "good" sensors. The image-digitizing system includes a sensor array, and a processor. The array can extend in one or more dimensions; each of its sensors provides an image signal corresponding to the portion of a visual image "viewed" by the sensor. The processor can include an analog-to-digital converter ADC), a data processor, and memory. The ADC converts the image signals to signal data. The processor converts the signal data to pixel data. The memory can store calibration values that characterize the function according to which the processor determines the image data from the signal data.

The present invention also provides an image-digitizing method in which a calibration procedure distinguishes bad sensors and good sensors. Good sensors respond within specifications to the portion of the image they view, while bad sensors do not. For the good sensors, the calibration procedure can also indicate adjustments that must be made to compensate for differences between good sensors. The adjustments can be stored as sensor calibration values in the memory. The calibration values can themselves be scalars or vectors (in other words they may be multidimensional). For example, a calibration value might include an offset value and a scaling value.

From a range of possible calibration values, a "bad-sensor" calibration value can be reserved to indicate a bad sensor. In the example in which an offset value and a scale value are used, a calibration vector corresponding to a maximum offset and a maximum scaling factor can be reserved to indicate a bad sensor. When the calibration value for signal data is associated with the bad-sensor calibration value, the image data for a corresponding pixel is generated, not as a function of the signal data from the bad sensor, but as a function of the signal data from one or more neighboring good sensors. (Two sensors are neighboring, for purposes herein, if one is closer to the other than are most other sensors in the array.) For example, a recently calculated pixel value can be replicated and used for the pixel associated with the bad sensor.

Where feasible, a sensor array with a bad sensor should be replaced with a sensor array with no bad sensors. However, the present invention reduces the subjective impairment imposed on a digitized image by a bad sensor. In general, the digitized image will be much more desirable than a digitized image in which the signal output by the bad sensor is faithfully represented. In most cases, the artifacts yielded by the invention will be unobjectionable, even if they are noticeable. Thus, the present invention provides an economical approach to maintaining satisfactory digital imaging performance even after a sensor fails.

DESCRIPTION OF THE PREFERRED EMBODIMENTS

Figure 1:
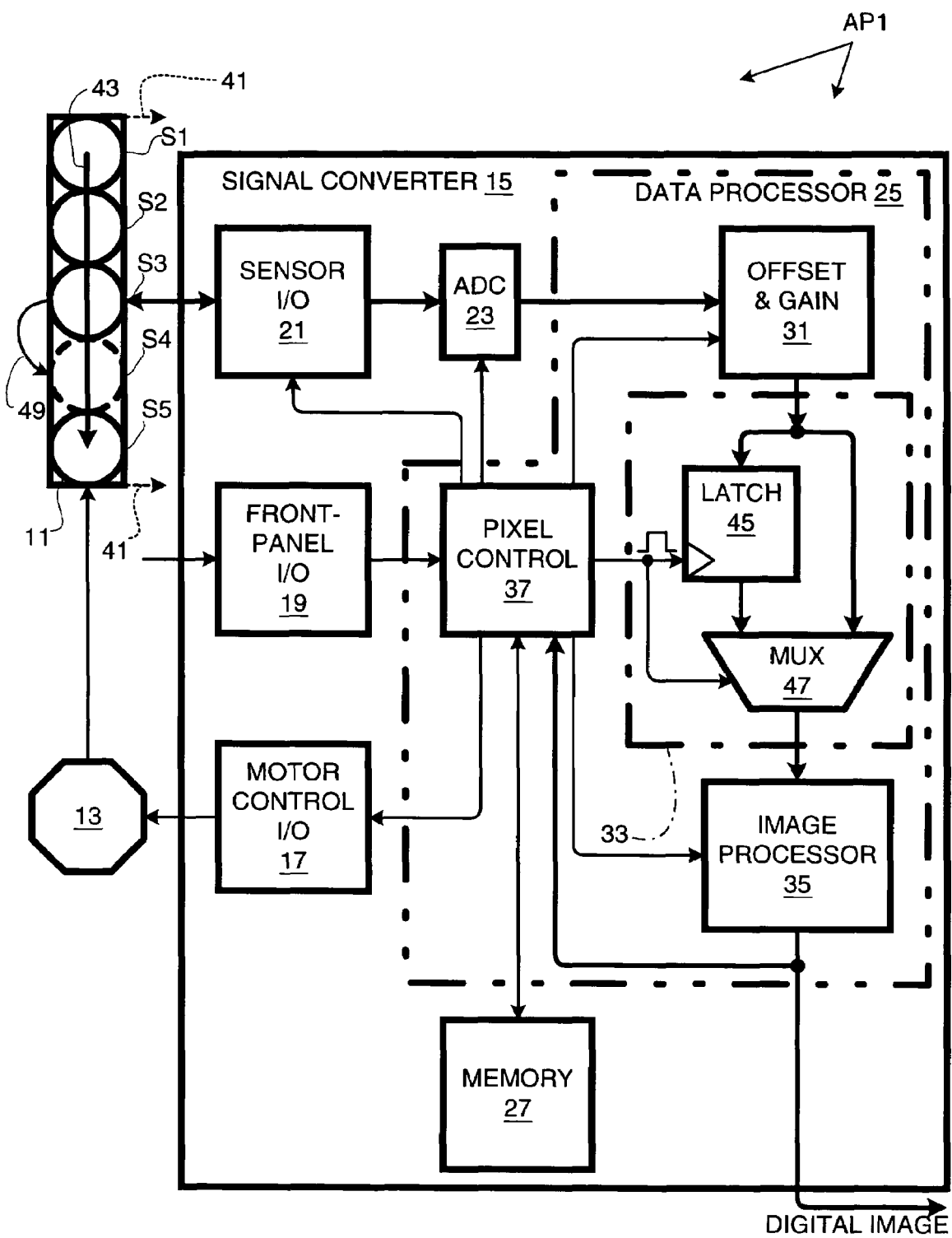
FIG. 1 is a schematic view of a scanning system in accordance with the present invention.

In accordance with the present invention, a scanning system AP1 comprises a sensor array 11, a scan motor 13, and a signal converter 15, as shown in FIG. 1. Sensor array 11 is a linear array of 2400 sensors (five shown). Signal converter 15 includes a motor control interface 17, a front-panel interface 19, a sensor interface 21, an analog-to-digital converter (ADC) 23, a data processor 25, and memory 27. ADC 23 converts analog sensor signals from sensor interface 21 to digital signal data that is processed by data processor 25. Data processor 25 includes an offset and gain function 31, a dead-pixel compensator 33, an image processor 35, and a pixel-and-timing controller 37. Controller 37 controls the timing and coordinates the operations of all the foregoing elements using data stored in memory 27.

Figure 2:
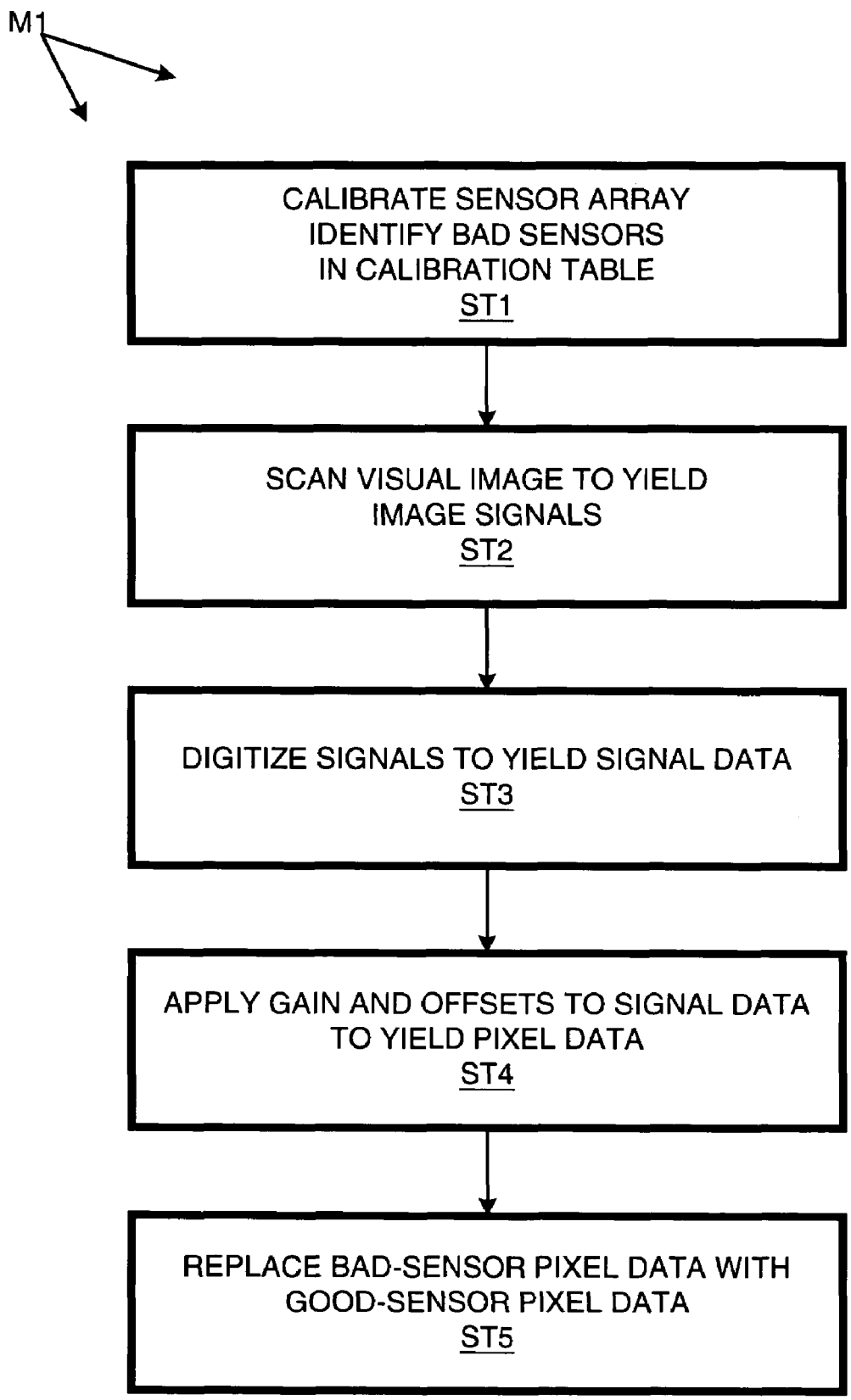
FIG. 2 is a flow chart of a method of the invention used in the context of the system of FIG. 1.

A scanning method M1 employed by system AP1 is flow charted in FIG. 2. During a calibration step ST1, the sensor array is calibrated; in the calibration process, "bad" sensors can be identified. An image is scanned in step ST2; in this step, the sensors generate signals representing the image being scanned. In step ST3, the image signals are digitized to yield signal data. In step ST4, gain and offset functions are applied to the signal data to yield pixel data. In step ST5, data derived from signals from a bad sensor is replaced by data derived from good sensors. For example, bad data can be replaced by the most recent good data. The result is a scanned image in which artifacts due to bad sensors are perceptually minimal.

Calibration step ST1 can involve many substeps, including setting maximal illumination levels, matching sensor outputs to the 10-bit dynamic range of ADC 23, and setting digital offset and gain values. Calibration can be initiated by pushing appropriate buttons on the front panel. The panel activity is detected by front-panel interface 19 and communicated to pixel-and-timing controller 37. Typically, calibration is done without media present. A white background or platen can be used as the calibration target.

To optimize the precision with which image tones are captured, a large portion of the dynamic range of the sensors should be used. To achieve this, the illumination source, in this case an array of LEDs, should be as bright as possible without saturating the sensors. When the sensors are saturated, they fail to distinguish between brighter and darker regions of the image. So, the calibration process can begin by determining a maximal illumination level that is well below sensor saturation. Since sensors vary in sensitivity, the maximal illumination should be below saturation for all sensors. However, method M1 provides for detecting "out-of-specification" sensors and excluding them as factors in determining the maximum illumination. In the present case, the illumination can be controlled as a function of the duration and magnitude of a current pulse to the LED array. In the case of a color scanner with different color LEDs, the brightness of each color can be adjusted independently.

During calibration, controller 37 commands motor control interface 17 to cause motor 13 to move sensor array 11 relative to the calibration target in the direction indicated by arrows 41. In practice, the sensor can be stationary and the target moved. Scanner AP1 is a raster image device, which means that the image is acquired line by line. Each calibration substep can involve acquiring ten or more raster lines and taking median values to minimize any effect of target artifacts. Scanning can be performed several times at different illuminations to determine which illumination levels appear to be near the top of the sensors' linear regions. Note that during analog calibration, dark-offset and gain function 31, dead-pixel compensator 33, and image processor 35 do not alter incoming data. The output of image processor 35 is fed back to controller 37 so that the latter can make calibration adjustments.

Once the maximal illumination levels are determined, analog circuitry in sensor interface 21 is adjusted to match the dynamic range of ADC 23. ADC 23 does not distinguish signals levels when they are above its dynamic range, and ADC 23 does not distinguish signals levels when they are below its dynamic range. Thus, image information can be lost if the signals to ADC 23 are not within its dynamic range. However, if the range of signal values is only a fraction of the ADC dynamic range, distinctions between tonal levels may be less precise than optimal.

Accordingly, the calibration procedure scans the target at zero illumination. The resulting signals are offset so that the minimum dark signal for the sensors (possibly excluding some "out-of-spec" sensors) is slightly above the minimum voltage threshold for ADC 23. Then the target is scanned at maximum illumination, and the gain of sensor interface 21 is set so that the resulting voltage is near but below the maximum of the ADC dynamic range.

At this point, the maximal illumination levels have been set and the analog signal-processing circuitry of sensor interface 21 has been adjusted to match the ADC dynamic range. These adjustments are concerned with sensor array 11 as a unit. Other than to exclude possible out-of-spec sensors, nothing has been done to address differences between sensors. These differences are handled in the digital domain.

Once the analog calibration is completed, digital calibration begins. The calibration target is scanned with illumination off. The resulting calibration data identifies differences in the dark signals levels from the sensors. For an 8-bit per-color channel scan, there are 256 possible tone levels. For each sensor, an offset is determined so that its dark value is 12, the minimum tone level of zero. The dark-level is set above 0 to avoid clipping as dark-signals values can vary with use. The dark-offset values are stored as a look-up table in memory 27.

Once the dark-offset values are set, one or more bright scans of the calibration target with the dark-offset compensation turned on can be used to determine gain factors for each sensor. The resulting dark-offset compensated data is used to match gains across the pixels. The gains are expressed as scaling factors from 1× to 3× encoded from 0 to 255. The results are stored in the offset table of memory 27 on a per-sensor basis.

Dead sensors do not respond to differences in tone levels. They may give off a constant "bright" signal or a constant "dark" signal: in the former case, dark-offset compensation fails; in the latter case, gain compensation fails. The approach taken herein is to force the compensation values for such sensors to extreme values: e.g., the dark-offset value is set to 255 and the gain is set to 255. The dark/gain compensation combination 255, 255 is then used to indicate a dead sensor. Data derived from a dead sensor is not to be used in generating an image during actual (as opposed to calibration) scanning.

Once calibration is complete, an actual scan is performed at step ST2. This can involve inserting an image-bearing sheet into a document feeder, activating scanner AP1, and sensing image reflectivity, and reading out sensors S1–S5 repeatedly in the direction of arrow 43 as the sheet passes. Scanning can be initiated at the front panel or from a host computer. Also, sheet detectors (not shown) can indicate the presence of a document by communicating to controller 37 via front-panel interface 19. In this case, scanning can begin automatically when a document is detected.

Illumination is at the maximum levels determined during calibration. The image signals are processed in the analog domain as determined during calibration. ADC 23 digitizes the image signals at step ST3 to yield signal data. Dark-offset and gain function 31 applies the dark-offset and gain values stored in memory 27 to the signal data to yield pixel-image data at step ST4. Controller 37 checks the compensation values as they are forwarded to compensation function 31. If the values are both 255, controller indicates a bad sensor to dead-pixel compensator 33, otherwise, a good sensor is indicated.

Dead-pixel compensator 31 includes a latch 45 and a multiplexer 47. When a good sensor is indicated, controller 37 sends a pulse to latch 45 and holds the control input of multiplexer 45 high. This causes the data associated with the good sensor to be latched into latch 45 and also passed to image processor 35. When a bad sensor is indicated, controller 37 withholds a pulse from latch 45 and holds the control input of multiplexer 47 low. This causes, at step ST4, the data associated with the bad sensor to be discarded and the most recent "good" data is passed to image processor 35. Even if plural bad sensors are processed consecutively, only data from good sensors is used in the image. The result is generally much more acceptable than the images with vertical "stripes" that would occur without the inventive correction.

In FIG. 1, five sensors S1–S5 are shown for array 11. Sensor S4 is shown in dash to indicate that it is defective. Sensor S3 is the immediately preceding, neighboring, good sensor. The substitution of the data associated with good sensor S3 for the data associated with bad sensor S4 in the digitized image is indicated by arrow 49. This corrected image data is provided to image processor 35, which can, for example, apply tone maps (e.g., to lighten or darken the image) to the image data.

The invention provides for different calibration strategies, including factory calibration, calibration on boot up, periodic in-use calibration, and user initiated calibration (either from the front panel for via a host computer). The calibration can involve the described analog calibration scheme, an alternative analog calibration scheme, or no analog calibration scheme. Dead pixels can be identified during an analog calibration procedure or during a digital calibration procedure. Also preferably, digital calibration yields a table that compensates for differences between sensors; in that case, preferably, certain values in the table are reserved to indicate dead sensors.

The invention provides for replacing data from bad sensors with data derived from neighboring good sensors. For simplicity, the preferred embodiment simply replicates the most recently determined tone associated with a good sensor. However, better results might be achieved in some cases by averaging values from neighbors on both sides of the dead sensor. While data from immediately neighboring sensors is preferred, the invention also provides for using data from less immediate neighbors to determine data to be assigned to dead pixels.

The present invention has applicability to digital imaging and computer fields. While scanners that are used as computer peripherals are the focus of the above description, other scanning applications, such as fax or other image transmission are provided for. In addition, the invention applies to digital video and still applications. These and other variations upon and modifications to the present invention are provided for by the present invention, the scope of which is defined by the following claims.

What is claimed is:

1. An image digitizing system comprising:
a spatial array of sensors for converting a visual image to signals, each of said sensors providing a respective signal during an imaging operation; and
a signal converter for converting said signals into pixel data describing an array of pixels, each of said pixels being associated with a respective one of said sensors during the imaging operation, the pixel data associated with at least one of said pixels being a function of signals provided by the respective sensors during the imaging operation, and at least one of said pixels during the imaging operation having an associated offset value and an associated gain value purposefully set to a highest value for a number of bits supported by the system such that the pixel data associated therewith is not a function of a signal from the respective sensor during the imaging operation but a function of one or more signals from neighboring sensors during the imaging operation.

2. An image digitizing system as recited in claim 1 wherein multiple pixels are associated with each sensor so that:
for at least one sensor, all pixels associated with that sensor have values that are functions of the signal provided by that sensor; and
for said least one sensor, all pixels associated therewith have values that are not functions of the signals provided by that sensor but are functions of signals provided by said neighboring sensors.

3. An image digitizing system as recited in claim 2 wherein said signal converter comprises:
an analog-to-digital converter for converting said signals to signal data;
a data processor for converting said signal data to said pixel data; and
memory for storing sensor calibration values that said data processor uses in converting said signal data to said pixel data, said sensor calibration values being selected from a set of possible calibration values, for at least one of said possible calibration values determining the function accordingly to which a pixel value is determined from the signal data from the signal from the associated sensor, a first of said possible calibration values indicating that the pixel value for the corresponding pixel is not to be a function of signal data from the associated sensor but a function of the signal data from a neighboring sensor.

4. An image digitizing system as recited in claim 3 wherein said sensor calibration values are two dimensional, with an offset-function value corresponding to an offset function and a scaling-function value corresponding to a scaling function, said possible calibration values defining an extreme scaling-function value and an extreme offset-function value, said first possible calibration value specifying said extreme offset-function value and said extreme scaling-function value.

5. An image digitizing method comprising:
calibrating an array of sensors so as to distinguish "good" and "bad" sensors during an imaging operation;
using said array of sensors to convert a visual image to signals during the imaging operation; and
converting said signals to image data including pixel values associated with an array of pixels during the imaging operation, each pixel corresponding to a respective one of said sensors during the imaging operation, pixel values associated with a good sensor being a function of the signal provided by that good sensor during the imaging operation, and pixel values associated with a bad sensor during the imaging operation having an associated offset value and an associated gain value purposefully set to a highest value for a number of bits supported by the system such that the pixel data associated with the bad sensor is not a function of the signal provided by that bad sensor during the imaging operation but is a function of at least one signal provided by a neighboring good sensor during the imaging operation.

6. A method as recited in claim 5 wherein said image data describes a series of raster lines, each of said raster lines including a series of said pixels, all pixels associated with said bad sensor having values determined not as a function of a signal provided by said bad pixel but as a function of said neighboring good sensor.

7. A method as recited in claim 6 wherein said converting step involves:

converting said signals into digital signal data; and converting said digital signal data into said image data using sensor calibration values associated with respective ones of said sensors, said sensor calibration values being selected from a range of possible calibration values, said bad sensor being associated with a possible sensor calibration value that indicates that the corresponding pixel data is determined not as a function of its signal but as a function of the signal of a neighboring sensor.

8. An image digitizing method as recited in claim 7 wherein said sensor calibration values are two dimensional, with an offset-function value corresponding to an offset function and a scaling-function value corresponding to a scaling function, said possible calibration values defining a maximal scaling-function value and a maximum offset-function value, the sensor calibration value for said bad sensor specifying said maximum offset-function value and said maximum scaling-function value.

9. An image-digitization method comprising the steps of:

using an array of sensors to generate a series of signals during an imaging operation; and converting said signals into pixel data describing an array of pixels during the imaging operation, each of said pixels being associated with a respective one of said sensors, the pixel data associated with at least one of said pixels being a function of signals provided by the respective sensors during the imaging operation, and at least one of said pixels during the imaging operation having an associated offset value and an associated gain value purposefully set to a highest value for a number of bits supported by the system such that the pixel data associated therewith is not a function of a signal from the respective sensor during the imaging operation but a function of a signal from a neighboring sensor during the imaging operation.

10. A method as recited in claim 9 wherein plural pixels are associated with each of said sensors so that for said at least one of said sensors none of the pixels associated therewith are described by pixel data that is a function of a signal associated with that sensor.

11. A method as recited in claim 10 wherein said converting step involves:

converting said signals into digital signal data; and converting said digital signal data into said pixel data using sensor calibration values associated with respective ones of said sensors, said sensor calibration values being selected from a range of possible calibration values, at least one of said possible calibration values indicating a sensor for which the corresponding pixel data is determined not as a function of its signal but as a function of the signal of said neighboring sensor.

12. An image digitizing method as recited in claim 11 wherein said sensor calibration values are two dimensional, with an offset-function value corresponding to an offset function and a scaling-function value corresponding to a scaling function, said possible calibration values defining a maximal scaling-function value and a maximum offset-function value, said first possible calibration value specifying said maximum offset-function value and said maximum scaling-function value.

* * * * *